United States Patent [19]
Van Maanen, Jr.

[11] Patent Number: 4,855,580
[45] Date of Patent: Aug. 8, 1989

[54] DATA MERGE DOCUMENT PROCESSING METHOD

[75] Inventor: Paul F. Van Maanen, Jr., Lewisville, Tex.

[73] Assignee: Recognition Equipment Incorporated, Irving, Tex.

[21] Appl. No.: 123,381

[22] Filed: Nov. 20, 1987

[51] Int. Cl.$^4$ .............................................. G06K 7/00
[52] U.S. Cl. .................................. 235/440; 235/436; 235/454; 382/7; 382/12
[58] Field of Search ............... 235/436, 440, 462, 463, 235/487, 454; 382/7, 12

[56] References Cited

U.S. PATENT DOCUMENTS

| | | | |
|---|---|---|---|
| 3,764,978 | 10/1973 | Tyburski et al. | 235/440 X |
| 3,876,981 | 4/1975 | Welch | 235/440 X |
| 3,949,363 | 4/1976 | Holm | 235/462 X |
| 4,013,894 | 3/1977 | Loote et al. | 235/440 X |
| 4,027,142 | 5/1977 | Paup et al. | 235/487 X |
| 4,080,528 | 3/1978 | Kao et al. | 235/449 |
| 4,205,780 | 6/1980 | Burns et al. | 235/454 |
| 4,243,983 | 1/1981 | Vyas | 382/7 |

*Primary Examiner*—David L. Trafton
*Attorney, Agent, or Firm*—Ross, Howison, Clapp & Korn

[57] ABSTRACT

A method for merging data from at least two data capture devices (12, 14) includes capturing data from a plurality of documents at a first data capture device (12). The captured data is stored in a first plurality of records. Within each of the plurality of records, the time the data was captured for the corresponding one of the plurality of documents is also stored. A calculation is made to determine the time elapsing between successive data captures using the time stored in the first plurality of records and an inter-document time is generated. Data is further captured from the plurality of documents at a second data capture device (14). The data captured from the second data capture device (14) is stored in a second plurality of records. Within the second plurality of records, the time the data was captured for the corresponding one of the plurality of documents is also stored. A calculation is made to determine the elapsed time occurring between successive data captures using the time stored in the second plurality of records. An inter-document time for the documents captured at the second data capture device is generated. The inter-document times for successive documents of the first plurality of records are compared with the inter-document times for the successive documents of the second plurality of records and a time variance signal is generated. The data stored in the first plurality of records is merged with the data stored in the second plurality of records if the time variance signal is within a predetermined range.

1 Claim, 2 Drawing Sheets

DATA MERGE DOCUMENT PROCESSING METHOD

TECHNICAL FIELD

This invention relates to document processing systems, and more particularly to a method for merging data captured from multiple data capture devices.

BACKGROUND OF THE INVENTION

The processing of documents using a high speed document transport may involve the use of multiple reading devices for capturing machine readable data as well as images from documents during processing. Document transport systems have the capability of reading machine readable data encoded on a document being processed, recording this data, and sorting the document in a predetermined manner according to the data. The machine readable data may be digitized and recognized by recognition devices and stored in various media.

Document transports may also include image capture cameras for presenting a picture of the document or a portion of the document being processed for interactive use by an operator. The captured image of the document may also be stored along with machine readable data appearing on the document. Since the document being processed passes along the transport, and since the reading devices are spaced apart along the transport, processing errors may occur due to document handling problems. These problems may result in an image of the document not being properly stored with the captured machine readable data in a single record or storage medium. Close feeds of documents along the transport as well as jams and missing documents from a continuous document processing stream can result in incorrect storage of data.

A need has thus arisen for a method for processing documents to assure that a remote receiving device such as a storage facility which receives records from two or more data capture devices merges the captured information in a single record associated with the document from which the information was captured.

SUMMARY OF THE INVENTION

A method for merging data from at least two data capture devices is provided. The method includes capturing data from a plurality of documents at a first data capture device. The captured data is stored in a first plurality of records, each one of the first plurality of records corresponding to one of the plurality of documents. Within each of the plurality of records, the time the data was captured for the corresponding one of the plurality of documents is also stored. A calculation is made to determine the time elapsing between successive data captures using the time stored in the first plurality of records, and an inter-document time is generated. Data is further captured from the plurality of documents at a second data capture device. The data captured from the second data capture device is stored in a second plurality of records, each of the second plurality of records corresponding to one of the plurality of documents. Within the second plurality of records, the time the data was captured for the corresponding one of the plurality of documents is also stored. A calculation is made to determine the elapsed time occurring between successive data captures using the time stored in the second plurality of records. An interdocument time for the documents captured at the second data capture device is generated. The inter-document times for successive documents of the first plurality of records are compared with the inter-document times for the successive documents of the second plurality of records and a time variance signal is generated. The data stored in the first plurality of records is merged with the data stored in the second plurality of records if the time variance signal is within a predetermined range.

BRIEF DESCRIPTION OF THE DRAWINGS

For a more complete understanding of the present invention and for further advantages thereof, reference is now made to the following Description taken in conjunction with the accompanying Drawings in which.

DESCRIPTION OF THE PREFERRED EMBODIMENTS

Figure 1:
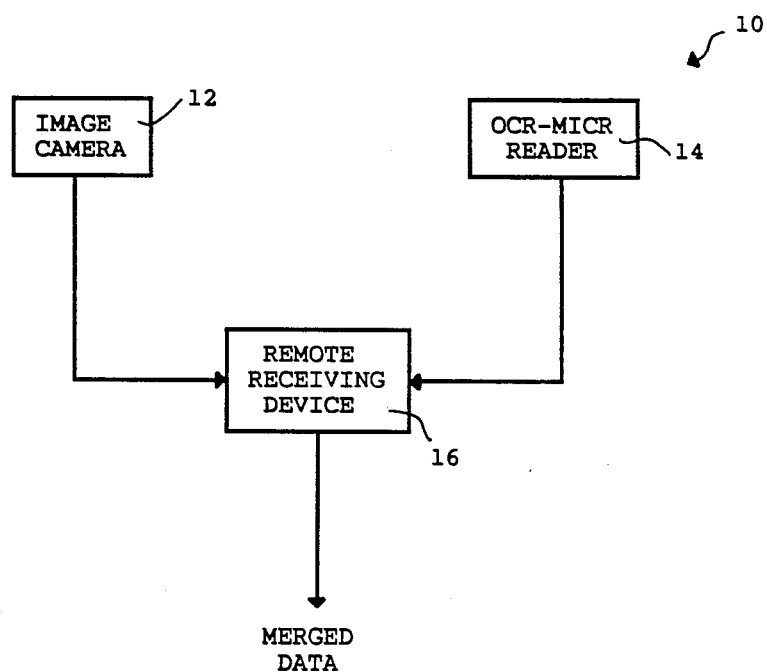
FIG. 1 is a block diagram of a system for carrying out the present method.

Referring to FIG. 1, a document processing system for carrying out the present method is illustrated and is generally identified by the numeral 10. Document processing system 10 includes a transport for transporting documents by an image camera 12 and an OCR or MICR reader 14. Image camera 12 and OCR or MICR reader 14 are shown for illustrative purposes only, the present method being utilized with any type of data capture device and any number of data capture devices disposed along a transport. Document processing system 10 may include, for example, the system described in U.S. Pat. No. 4,205,780, which description is hereby incorporated by reference.

The output of image camera 12 and the output of OCR or MICR reader 14, representing the captured data, are stored in separate records within a remote receiving device 16. The output of remote receiving device 16 represents the merged records in which the information captured by image camera 12 and OCR or MICR reader 14 are stored within a single record for each document processed by document processing system 10.

Remote receiving device 16 in accordance with the present method performs the merge operation by time stamping each record received from image camera 12 and OCR or MICR reader 14. The time stamped value is the tim the image camera 12 and OCR or MICR reader 14 detected the document and is used by remote receiving device 16 to track the records received from these data acquisition devices. Remote receiving device 16 calculates the elapsed time occurring between document records per data capture device and compares the inter-document time with each record. If the inter-document times are within a predetermined range, the merge operation takes place. If the inter-document times are outside the predetermined range, the records received by the remote receiving device 16 do not correspond to the same document captured by image camera 12 and the information read by OCR or MICR reader 14 and therefore no merge takes place.

Figure 2:
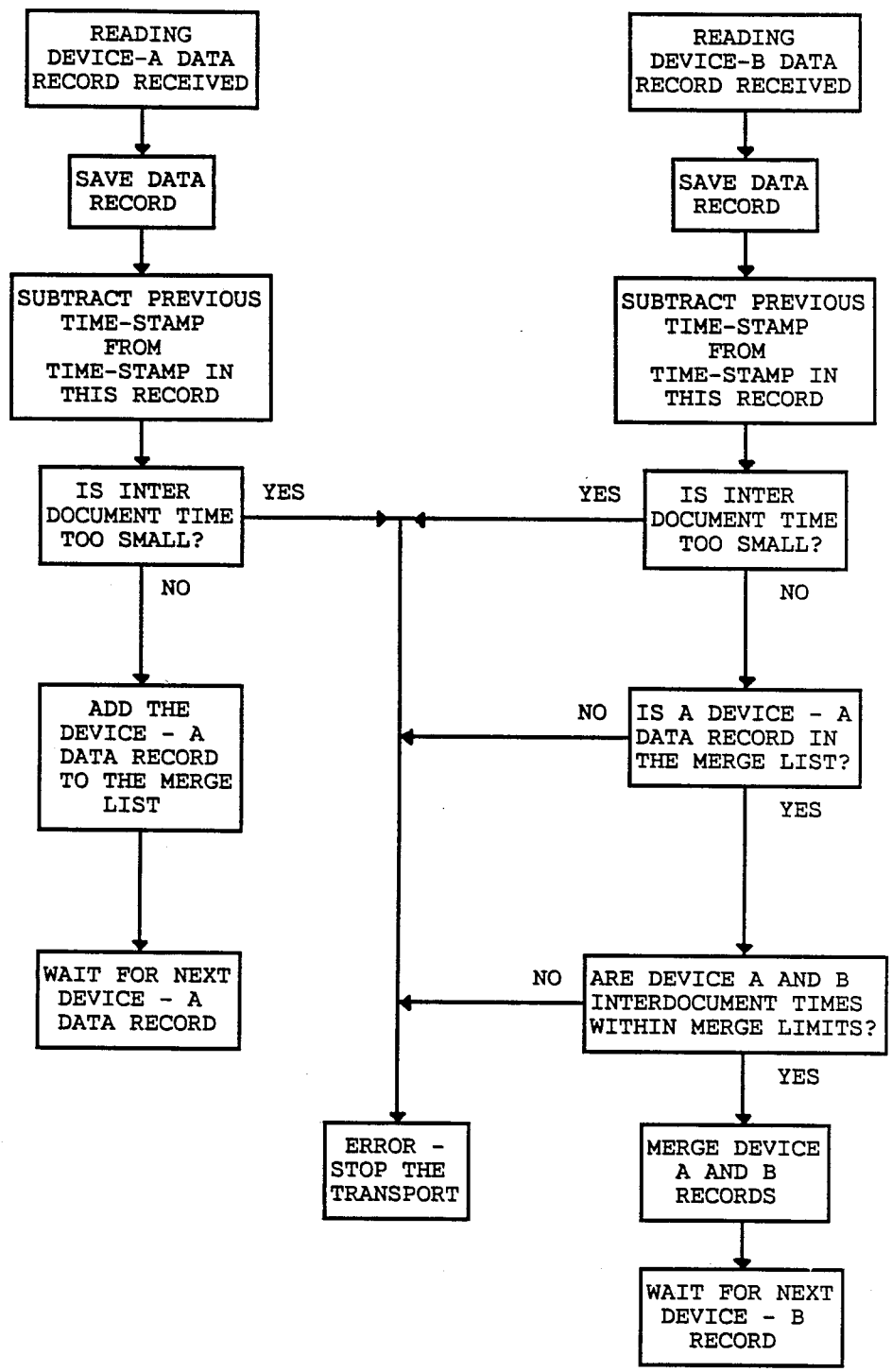
FIG. 2 is a block diagram illustrating the steps of the present method.

Referring to FIG. 2, data is acquired from each reading device A and B and is stored in a record. The inter-document time or the elapsed time between data captured by each data capture device is calculated. A determination is then made as to whether the inter-document time is too small. Such an indication represents a close feed occurring at one or both of the data capture devices (image camera 12 and OCR or MICR reader 14). If the inter-document time is too small, an error signal is generated and the document transport is stopped. No further merging of the captured data is performed until the error is corrected.

If the inter-document time is not too small for the first reading device, the record is placed in the merge list until the second data capture device completes its processing.

If the inter-document time is not too small for the second data capture device, and if a record from the first data capture device is in the merge list, a determination is made as to whether the elapsed time between data captures performed by the first and second data capture units is within a merge limit. If this elapsed time is correct, the records captured by the first and second devices are merged and the system waits for the acquisition of new data.

The determination of whether the inter-document time is too small addresses the problem experienced in using high speed document transports of close feeds. If the elapsed time between acquisition of data by the two data capture devices is outside a predetermined range, this parameter indicates that the corresponding document has not been captured by the second data capture unit along the transport and there is a missing document in the sequence of documents being processed. Therefore, by monitoring the time of acquisition of data, both the close feed and missing document problems associated with high speed document processing are detected and document processing is stopped prior to the compilation of erroneously merged records. The time stamping of each record allows for the tracking of each record during processing and merging of these records. The reading devices time stamps need not be synchronous since the inter-document time is calculated and used for comparison purposes.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A method for merging data from at least two data capture devices including the steps of:

capturing data from a plurality of documents at a first data capture device;

storing the data captured by the first data capture device in a first plurality of records, each one of the first plurality of records corresponding to one of the plurality of documents;

storing in the first plurality of records the time the data was captured for the corresponding one of the plurality of documents;

calculating the time elapsing between successive data captures using the time stored in the first plurality of records and generating an inter-document time for documents captured at the first data capture device;

capturing data from the plurality of documents at a second data capture device;

storing the data captured by the second data capture device in a second plurality of records, each of the second plurality of records corresponding to one of the plurality of documents;

storing in the second plurality of records the time the data was captured for the corresponding one of the plurality of documents;

calculating the time elapsed between successive data captures using the time stored in the second plurality of records and generating an inter-document time for documents captured at the second data capture device;

comparing the inter-document time for successive documents of the first plurality of records with the interdocument time for successive documents of the second plurality of records and generating a time variance signal; and merging the data stored in the first plurality of records with the data stored in the second plurality of records when the time variance signal is within a predetermined range.

* * * * *